United States Patent [19]

Morgan et al.

[11] Patent Number: 4,488,638
[45] Date of Patent: Dec. 18, 1984

[54] LIVE ROLLER ACCUMULATING BRAKE CONVEYOR

[75] Inventors: Steven J. Morgan, Jeffersonville, Ind.; Frank M. Lauyans; Gregory R. Judge, both of Louisville, Ky.

[73] Assignee: Figgie International Inc., Willoughby, Ohio

[21] Appl. No.: 382,594

[22] Filed: May 27, 1982

[51] Int. Cl.³ .................... B65G 47/26; B65G 13/06
[52] U.S. Cl. .................................. 198/781; 193/35 A
[58] Field of Search .................... 198/781, 460, 784; 193/35 A

[56] References Cited

U.S. PATENT DOCUMENTS

| | | | |
|---|---|---|---|
| 1,900,150 | 3/1933 | Anderson | 198/781 |
| 2,194,219 | 3/1940 | Eggleston | 198/789 |
| 3,601,247 | 8/1971 | Lowrie | 198/781 |
| 3,616,894 | 11/1971 | Koennecke et al. | 198/781 |
| 3,621,982 | 11/1971 | Fleishauer | 198/781 |
| 3,627,092 | 12/1971 | Fleischauer | 198/781 |
| 3,696,912 | 5/1969 | Fleischauer | 198/781 |
| 3,718,248 | 2/1973 | Muller | 198/781 |
| 3,724,642 | 4/1973 | DeGood | 198/781 |
| 3,768,630 | 10/1973 | Inwood et al. | 198/781 |
| 3,770,102 | 7/1971 | De Good | 198/781 |
| 3,840,110 | 10/1974 | Molt et al. | 198/781 |
| 3,900,097 | 8/1975 | deCourcy | 198/781 |
| 3,960,262 | 6/1976 | Henig | 198/781 |
| 4,096,942 | 6/1978 | Shepherd | 198/781 |
| 4,174,777 | 11/1979 | Riehle | 198/781 |
| 4,219,115 | 8/1980 | Moore | 198/781 |
| 4,240,538 | 12/1980 | Hawkes et al. | 198/781 |
| 4,253,558 | 3/1981 | Roeing et al. | 198/781 |
| 4,273,239 | 6/1981 | Thwaites et al. | 198/781 |
| 4,278,166 | 7/1981 | Pirro, Jr. | 198/781 |
| 4,362,238 | 12/1982 | Rivette | 198/781 |
| 4,372,441 | 2/1983 | Krammer | 198/781 |
| 4,392,568 | 7/1983 | Turnbough et al. | 198/781 |

Primary Examiner—Joseph E. Valenza
Assistant Examiner—Daniel R. Alexander
Attorney, Agent, or Firm—Wood, Herron & Evans

[57] ABSTRACT

A chain driven, live roller accumulating conveyor is defined by a plurality of accumulation zones, each having a pneumatically actuated clutch for selectively driving each zone, and a pneumatically controlled brake for braking an idler roller in each zone when the clutch is disengaged. Methods for accumulating are included.

10 Claims, 6 Drawing Figures

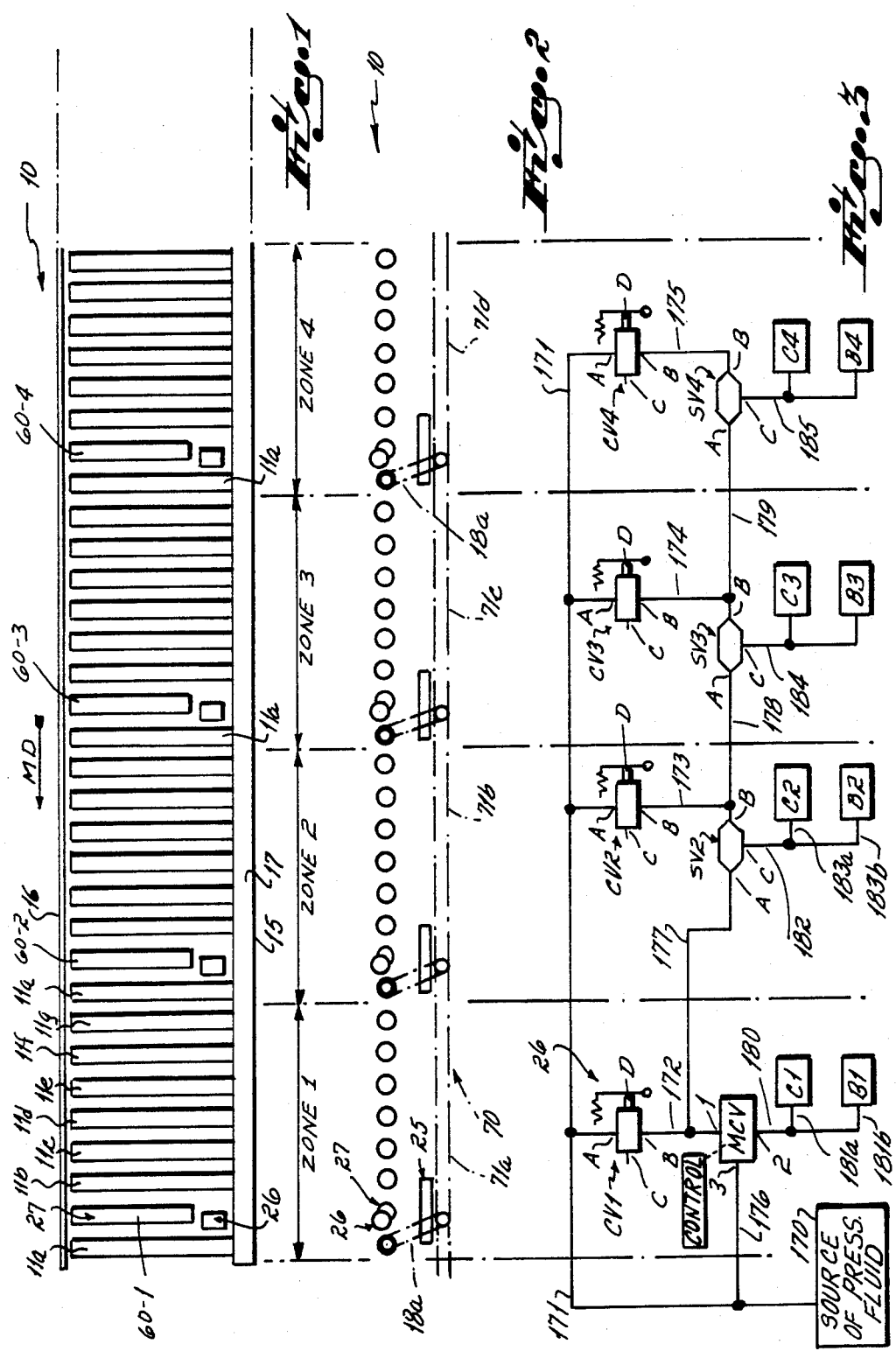

LIVE ROLLER ACCUMULATING BRAKE CONVEYOR

This invention relates to accumulating conveyors, and more particularly to live roller accumulating conveyors having a plurality of zones in which loads can be accumulated.

Chain driven, live roller, accumulating conveyors are well known in the art. These usually include a plurality of rollers divided into independently driven roller sets defining accumulation zones. The rollers of each zone are selectively engaged or disengaged from a zone drive in order to convey loads through the zone, or to accumulate a load or loads within the zone. Controls are provided for activating or deactivating the drive, typically in response to the disposition of downstream loads.

Where clutches are used to engage or disengage the rollers of a zone to a motive power drive, disengagement of the clutch, in effect, idles the rollers of the zone. Although the rollers and their drive chains comprise a system subject to their own frictional influences and inertia, the rollers of a disengaged zone may continue to rotate for some time after the clutch is disengaged for the purpose of stopping the zone for accumulation. This occurs particularly where a package or load is moving through the zone at conveyor speed when the clutch is disengaged. Such systems permit the load to coast some distance. If the load is near the downstream end of the zone, it could coast at least partially through the zone and onto the next zone.

When a load bridges two zones, which may be driven or stopped at different times, severe problems may arise in the operation and function of the conveyor. For example, the first starting downstream zone may pull the following load onto itself. This interrupts the desired load separation and singulation function of the conveyor, since now two loads are driven by the same zone.

Also, the coasting load may travel into the next downstream zone and engage the preceding load, disrupting the desired zero pressure condition of separated loads in an accumulated condition.

Failure of the accumulator to adequately space loads as they discharge may cause jamming of downstream equipment as a result of mis-indexed loads, or undesirable double load transfers or other malfunctions.

It will also be appreciated that many accumulator conveyors of the past are complex and require a substantial number of special, nonstandard parts. Accordingly, such accumulator conveyors must be manufactured from many nonstandard items, and are thus quite expensive.

Accordingly, it has been one objective of this invention to provide an improved accumulator conveyor.

A further objective of the invention has been to provide an improved zero pressure accumulating conveyor eliminating undesirable coasting of loads between zones.

A further objective of the invention has been to provide apparatus by which standard chain driven live roller conveyors can be easily converted to chain driven, live roller, accumulating brake conveyors according to the invention herein.

A further objective of the invention has been to provide improved load sensing and load handling apparatus in a chain driven, live roller zero pressure accumulating conveyor.

A further objective of the invention has been to provide improved load conveying and accumulating methods.

To these ends, a preferred embodiment of the invention includes a pneumatically controlled, chain driven, live roller, accumulating conveyor having a number of accumulating zones, each connected to a drive means by a pneumatic clutch, and each provided with a pneumatically actuated brake roller which is controlled to brake loads on the zone when the clutch is disengaged for accumulating. The brake roller is located near the downstream end of each zone and is braked, when the clutch is disengaged, to prevent any load on the roller from coasting onto the next zone.

Preferably, a load sensor is located in each zone adjacent an end of the brake roller, which is shorter than the live rollers of the zone. Disposition of the sensor slightly downstream of the brake roller insures that a load is over the brake roller when it is stopped, the leading lower surface of the load engaging the sensor for actuating the brake.

Pneumatic controls are preferably utilized to control the pneumatic clutch and the pneumatically controlled brake in a fail safe fashion. That is, pneumatic pressure is required to cause the clutch to engage and to maintain the brake in a non-braked condition. In the absence of pneumatic pressure, the zones are disengaged from any drive, and the brakes are engaged.

Accordingly, this embodiment contemplates connecting the clutch and the brake to a common pneumatic conduit where the presence of pressure engages the clutch and disengages the brake. Absence of pressure disengages the clutch and engages the brake.

Operation of the conveyor in an accumulation mode includes engaging all zone clutches when no loads are on the conveyor, sensing a load in one zone, sensing a load in the next upstream zone, disengaging the clutch of said upstream zone in response to said sensing, and engaging the brake roller of said upstream zone in response to said sensing. When the load is cleared from the one zone, the next upstream brake roller is released and the clutch thereof engaged to drive the load on the upstream zone onto the new cleared zone.

Also, the preferred embodiment of the invention includes an accumulator module facilitating the modification of a standard chain driven, live roller conveyor to a chain drive, live roller accumulating brake conveyor. Specifically, the load sensor, brake roller, and clutch means are all mounted on modular frame components disposed beneath the conveyor, the sensor and brake roller extending upwardly to a load conveying path in the location where a normal load carrying roller is otherwise placed. One such module is provided for each zone. According to the invention, in order to produce a chain driven, live roller, accumulating brake conveyor from a normal chain driven live roller conveyor, it is only necessary to disconnect any common roller drive chain from one desired zone to the other, to mount the module, to connect the clutch means, via a chain, to a downstream roller in each zone, and to connect the various pneumatic conduits together.

Accordingly, an improved accumulator conveyor is provided with means preventing undesirable load coasting from one zone to the next. Loads are positively and uniformly braked in the respective zones, and zero pressure accumulation is positively secured. Conveyors according to the invention provide positive load control and disposition of all loads thereon even while respective zones are disengaged from their drive.

Moreover, it will be further appreciated that the invention provides means by which standard chain driven, live roller conveyors can easily be converted to chain driven live roller, accumulating brake conveyors, according to the invention, by the simple addition of accumulating modules thereto.

These and other advantages of the invention will become even more apparent from the following detailed description of the preferred embodiment, and from the drawings in which:

FIG. 1 is a plan view of an accumulating brake conveyor according to the invention;

FIG. 2 is a diagrammatic elevational view of the conveyor of FIG. 1;

FIG. 3 is a diagrammatic pneumatic control circuit for controlling the conveyor of FIG. 1 according to the invention;

FIG. 4 is a more detailed plan view of portions of zones 1, 2 and 3 of the conveyor of FIG. 1;

FIG. 5 is a cross sectional view taken along lines 5—5 of FIG. 4; and

Figure 6:
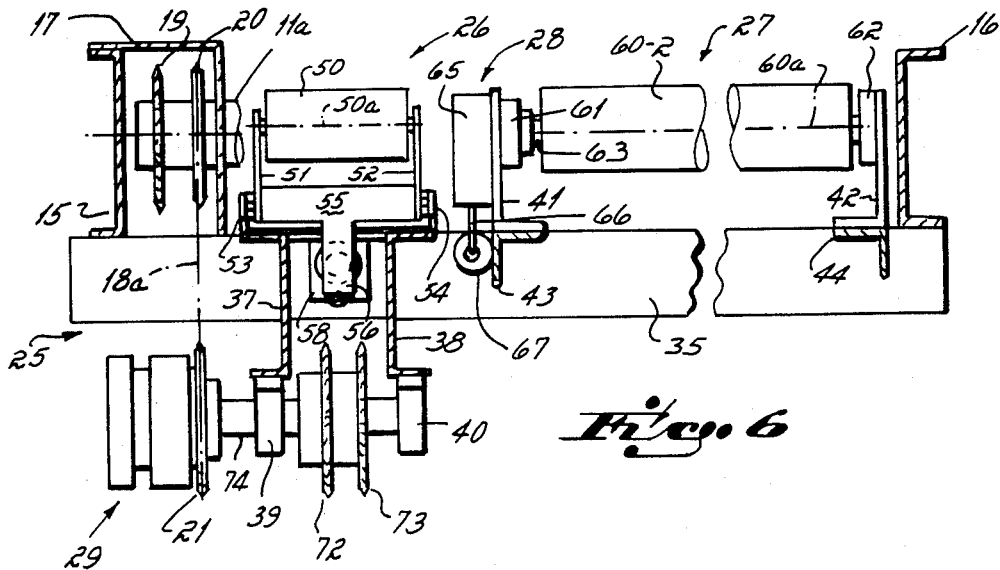
FIG. 6 is a cross sectional view taken along lines 6—6 of FIG. 5.

Turning now to the drawings, there is depicted in FIG. 1 a chain driven, live roller accumulating brake conveyor 10 according to the invention. The conveyor comprises a plurality of chain driven, live rollers such as rollers 11, for example, divided into a plurality of zones. As shown in FIG. 1, the conveyor includes zones 1, 2, 3 and 4, although additional zones may be utilized. The load carrying rollers are all identified by the number 11, however, specific rollers may be identified by the number 11 followed by a letter suffix where differentiation is desired.

For the purposes of description, zone 1 will be referred to as an accumulating zone and as a discharge zone, while zones 2, 3, 4 and so on are referred to only as accumulating zones. The conveyor, as perhaps best seen in FIG. 6, includes parallel conveyor side rails 15 and 16 with the rollers mounted on shafts therebetween. As perhaps best seen in FIG. 4, one end of most of the rollers 11 are provided with two sprockets. This is also shown in FIG. 6 where sprockets 19 and 20 are shown on a roller 11a. A shroud 17 is provided over the sprockets for enclosing them, as shown in FIG. 6. It will be appreciated that it is not necessary to provide the last roller, or the upstream most roller in each zone, such as roller 11g in zone 2 (FIG. 4) with two sprockets since it will not be necessary to connect that roller to the immediately upstream zone 3.

Chains 18 are provided between the sprockets on adjacent rollers in order to drive the rollers. For the purposes of description, zone 2 in FIG. 4 indicates chains 18a, 18b, 18c, 18d, 18e, 18f and 18g. These chains alternate as shown in FIG. 4 to cause all of the rollers 11a through 11g of zone 2 to be commonly driven. Chain 18a is connected between sprocket 20 on roller 11a and a clutch sprocket 21, as will be further described, for connecting all of the rollers of a zone to a common drive power train.

It will be appreciated throughout this description that unless otherwise noted, the zones are constructed similarly so that like numbers can be applied to like parts of each zone. Accordingly, and unless otherwise noted, a description of zone 2, for example, will be the same as a description of the other zones in the conveyor. Discharge zone 1 may vary according to a particular conveying function as to how loads are discharged. Preferably, and for purposes of this description, it is similar in structure to the other zones, with only the pneumatic control associated therewith varying as will be described.

It will also be appreciated that the general construction of the conveyor, including the side rails 15 and 16, shroud 17, sprockets on the ends of the rollers 11 and the rollers themselves are all standard chain driven, live roller conveyor parts, the rollers being mounted on shafts extending between or through the side rails and being driven by alternating chains between each roller.

In order to convert such a conveyor into a chain driven, live roller accumulating brake conveyor according to the invention, it is necessary to disconnect the drive of the rollers for one zone from the rollers of the other zones so that the rollers of each zone can be driven independently of the rollers of the other zones. This is accomplished in a chain driven, live roller conveyor simply by disconnecting any chain extending from the roller 11g, for example, of zone 2 (FIG. 4) to the roller 11a in zone 3 (FIG. 4) and any chain ordinarily connecting the roller 11a of zone 2 to the roller 11g of zone 1 (FIG. 4).

Moreover, and according to the invention, a common chain driven, live roller conveyor is modified to a chain driven, live roller accumulating brake conveyor by the addition of a sensing, braking and drive module, or an accumulating module 25, as shown in FIGS. 5 and 6. This module comprises a number of structural and functional features. Functionally, the module includes a load sensing means 26, a brake roller means 27, a brake means 28 and a clutch means 29.

From a structural standpoint, the module includes cross ties 35 and 36 (FIG. 5), channels 37 and 38, and drive bearings 39 and 40, and brake roller brackets 41 and 42 mounted on ties 43 and 44.

The cross ties 35 and 36 are parallel to each other and are perpendicular to the conveyor side rails 15 and 16 which the cross ties join. The channels 37 and 38 extend between the cross ties and form a mount for the sensing means 26 and for the clutch means 29. The ties 43 and 44 extend across the ties 35 and 36 and form a mount for the brake roller, as described. The ties 35 and 36 are not illustrated in FIG. 4 for clarity purposes.

The sensing means 26 includes a trip roller 50 mounted between pivoted side plates 51 and 52. These are pivoted, to suitable brackets 53 and 54 which are mounted on the channels 37 and 38. The side plates are connected to a cross member 55 which includes a depending paddle or paddle means 56 for the purpose of engaging a pneumatic control valve, as will be described. The lower end of paddle 56 is provided with a spring 57 secured to a stationary bracket 58 (FIG. 5) for the purpose of urging the trip roller into an upright condition as shown in FIG. 5. Since the upper surface of the trip roller is slightly above the load carrying surfaces of the rollers 11, any loads moving down the conveyor will engage the trip roller 50 and cause it to rotate the side plates 51 and 52 and the paddle 56 in a counterclockwise direction, as viewed in FIG. 5. This will have the effect of releasing the plunger D of the pneumatic control valve CV-2 in zone 2 of FIG. 5, for example, and for the purposes to be described. When a load is not located in the area of the trip roller, the spring 57 is operable to move the trip roller into the position as shown for closing the plunger D of the various control valves in the respective zones.

The brake roller means 27 includes a brake roller 60 (referred to as brake rollers 60-1, 60-2, etc., through the zones) mounted between the brackets 41 and 42 by means of bearings 61 and 62. The brake roller is mounted on a shaft 63 which extends through the bearings so that the brake roller is secured on the shaft and turns with the shaft as the shaft rotates in the bearings. The brake means further includes a braking apparatus 65 mounted outside the brake roller bracket 41 and secured to the shaft 63 for selectively braking the shaft 63 and the roller 60. The brake apparatus 65 includes a brake actuating arm 66 having a lower end attached to a brake actuating air cylinder 67. When the plunger of the air cylinder is extended, the brake actuating arm is moved in order to release the brake 65 from the shaft 63 and permit the brake roller 60 to freely rotate. When pneumatic pressure is released from the cylinder 67, the spring loaded cylinder is operable to return the brake arm to a braking position, causing the brake 65 to brake the shaft 63 and thus the brake roller 60.

Other suitable load brakes can be used in accordance with the invention.

While any suitable braking means will suffice, a ratchet brake operated by an air cylinder is believed to be suitable. Such a suitable brake is a ratchet brake distributed by the Lowell Corporation of Worcester, Mass. under its model designation, "Lowell Series 70 Ratchet Device." Such a brake includes a gear, which is secured to a shaft, and one or more pawls for selective engagement with the gear to brake the shaft against rotation. The pawl position depends on the condition of a brake actuating arm which can be moved to displace the pawl away from the gear to permit the shaft to rotate freely, or moved to another position to permit the spring biased pawl to fall into contact with the gear and thereby prevent any further motion of the shaft which is secured to the gear. Of course, such a brake may include a second pawl for preventing rotation of the gear in an opposite direction, should that be desired. Otherwise, any second pawl could be omitted.

While any suitable brake actuating air cylinder can be used, one believed to be suitable is, for example, an air cylinder manufactured by the Bimba Manufacturing Company under its model designation, Bimba ¾" Bore Air Cylinders 04-P. Such a cylinder is provided with a spring return so that when the cylinder is pressurized, the plunger is extended, and when the cylinder is depressurized or vented, the plunger is returned by means of a spring in the cylinder.

In connection with the preferred embodiment, then, the pressurization of the air cylinder 67 causes the brake arm 66 to move a pawl in the brake 65, thereby releasing the shaft 63 for rotation of roller 60. The venting of the cylinder 67, or its depressurization, permits the brake arm 66 to move to another position as a result of the spring return action of the cylinder 67, thereby braking the shaft 63.

Turning now to the clutch means 29, it will be appreciated that the clutch means is operable for selectively connecting the rollers of the zone serviced by the clutch to a drive means comprising a common power train 70 (FIG. 2). Common power train 70 comprises a plurality of continuously driven drive chains 71a–71d connected to a source of motive power, such as a drive motor (not shown in the figures) and located at any convenient location of the conveyor, preferably on the downstream end. The power of the drive train 70 is provided to each zone by means of alternating chains 71a–71d and the sprockets 72, 73, as shown in FIG. 6. As shown in FIGS. 4 and 5, and by sprockets 72, 73 in FIG. 6, the chains 71 of the power train alternate such that a chain 71a extending from zone 1 runs around sprocket 73, while another power train chain 71b runs around sprocket 72 at the downstream end of zone 2, and is connected to the sprocket 72 at the downstream end of zone 3. The drive sprockets 72 and 73 of the power train are secured to a shaft 74 mounted in bearings 39 and 40 and secured within clutch means 29.

Clutch means 29 comprises a pneumatically actuated clutch of any well-known type. Such a clutch may, for example, include axially movable friction plates which are urged together by the application of pressurized air to the clutch in order to connect the shaft running through the clutch with a normally otherwise freely rotatable sprocket 21 thereon. In the absence of pressurized air, internal springs in the clutch urge the friction plates apart for clutch disengagement. Accordingly, when the clutch is actuated by the application of pressurized air thereto, the drive shaft 74 from the power train is coupled to the sprocket 21 (FIG. 6). While any suitable pneumatically actuated clutch may be utilized, a clutch such as that manufactured by the Mach III Clutch Company of Ludlow, Ky. under its model designation, ASR, can be utilized as described herein.

Accordingly, when the chains 71 are continuously driven, the clutch means 29 of each zone is operable to selectively couple the driving power of those chains, via the shafts 74 and the drive chains 18, to the load carrying rollers 11 of the various zones. Since a single clutch is provided for each zone, each of the zones can be driven independently of the other zones, there being no drive connection between the rollers of the respective zones, for example.

Turning now to FIG. 3, a control means suitable for controlling the conveyor of the invention herein will now be described. It will be appreciated that any suitable control means can be utilized for any suitable drive means to selectively couple and uncouple the load conveying rollers of each independent zone to and from a motive power source in order to drive the rollers for conveying loads through the zone and to stop the rollers for accumulating loads in the zone. The specific pneumatic control means of FIG. 3 is believed to be particularly useful for use in this regard. While a pneumatic control means is described, it will be appreciated that hydraulic or electrical control means and drive means could be utilized as well.

It will be appreciated that the clutch means of each zone are diagrammatically shown in FIG. 3 and are designated as C1, C2, C3 and C4. The clutches for each zone are preferably similar.

Also, the brake means 28 of each zone are also diagrammatically illustrated in FIG. 3 and are designated as B1, B2, B3 and B4.

The control means for the accumulating brake conveyor includes a source 170 of pressurized fluid, such as compressed air, having a main supply conduit 171 for supplying the valves and the clutches and brakes as will be described.

The control means for each zone includes a control valve, designated CV1, CV2, CV3 and CV4, respectively, for the respective zones 1 through 4. Each control valve constitutes a normally closed, three-way poppet valve or pushbutton valve. Any such suitable valve can be utilized, however, one valve believed to be particularly suitable is a valve made by the Humphrey Products Company of Kalamazoo, Mich. and distributed under their model designation, 250P-3-10-21. Such valve generally includes an input, an output, and an exhaust port for venting the output side of the valve. A control stem or plunger for actuation by the paddle 56, as has already been described, is also included.

The input port A of each control valve is connected to the supply conduit 171 and the output port B of each control valve is connected to the respective conduits 172, 173, 174 and 175, as shown in FIG. 3. The exhaust port C of each control valve is simply vented to the atmosphere. Each of the valves is normally closed by spring means within the valves to connect the ports A and B in the valve so as to pressurize the conduits 172 through 175 when pressure is available in the supply conduit 171. When the valves are actuated, however, by means of the paddles 56, so as to depress the respective plungers D of each valve, the valves are operable to disconnect their ports B from their ports A and to vents the ports B and their respective exhaust conduits 172 through 175 through the exhaust ports C. In this regard, it will be appreciated that the plungers D of each control valve can be directly actuated by the paddles 56. Ball actuators or other linkages can be used for operating the control valves.

A master control valve MCV is provided in discharge zone 1 only and has an inlet port 1, an inlet port 3 and an outlet port 2. Inlet port 1 is connected to the conduit 172 from the control valve CV-1. Inlet port 3 is connected through a conduit 176 to the supply conduit 171. Outlet port 2 is connected to the conduit 180 which constitutes a common pneumatic conduit for both clutch C1 and brake B1 as shown in FIG. 3. Conduit 180 is connected to the clutch C1 by means of conduit 181a and to brake B1 by means of conduit 181b. It is also noted that the conduit 172 is connected directly to a conduit 177 leading from zone 1 to an inlet port A of a shuttle valve SV-2, located in zone 2. Inlet port 3 and the inlet port 1 of the master control valve MCV are never connected, so conduit 177 is vented or pressurized only through conduit 172.

The master control valve MCV comprises a solenoid operated poppet valve which is selectively actuated to alternately connect the inlet port 1 with the outlet port 2 or the inlet port 3 with the outlet port 2. While any suitable valve can be used to perform this function, one particular valve which has been found suitable is a valve made by Mac Valves, Inc. as its Series 100, selector, in-line, normally closed and normally open valve. Such a valve is connected to electrical or other suitable means (labeled control) for operation, as will be hereinafter described. Also, the valve MCV could be manually operated.

Each of the accumulation zones upstream of the discharge zone 1, and exclusive of zone 1, includes a shuttle valve designated SV-2 for zone 2, SV-3 for zone 3 and SV-4 for zone 4. Each of the shuttle valves has inlet ports A and B and an outlet port C. The inlet port A is connected to a conduit 177, 178 or 179, for example, extending from the next downstream zone. Conduit 177 extends from the outlet conduit 172 of the control valve CV-1. Conduit 178 extends from the inlet port B of shuttle valve SV-2 and is connected with a conduit 173 to the control valve CV-2. Conduit 179 is connected to both the inlet port B of the shuttle valve SV-3 and conduit 174 of the control valve CV-3, and so on through the zones.

Each of the shuttle valves comprises a poppet type shuttle, double check, valve. Once such suitable shuttle valve which has been found useful is a shuttle valve referred to as the Clippard "Mini-Matic" shuttle valve, Model MJSV-1, produced by the Clippard Valve Company of Cincinnati, Ohio. In each shuttle valve port A or port B is connected to outlet port C, depending upon the application of pressure to port A or port B, as will be described. A ball check (not shown) is typically used in such a valve.

Further describing the pneumatic circuitry as depicted in FIG. 3, it will be appreciated that the clutch C1 and the brake B1 are connected through conduit 180 to the outlet port 2 of the master control valve, and selectively therethrough to port B of CV-1 via conduit 172. In zone 2, the clutch C2 and the brake B2 are connected via common conduit 182 and conduits 183a and 183b to the outlet port C of the shuttle valve SV-2. In zone 3, the clutch C3 and the brake B3 are connected via common conduit 184 to the outlet port C of the shuttle valve SV-3. In zone 4, the clutch C4 and the brake B4 are connected via common conduit 185 to the outlet port C of shuttle valve SV-4.

It will be appreciated that the conveyor 10 according to the invention may be constructed to include various conduits, valves and mounting means therefor in any suitable manner. Such conduits and mounting means may be provided within each of the modules as described above and provided with appropriate fittings for connecting the various valves together.

Operation

Primarily, the conveyor operates selectively in either a continuous conveying mode or an accumulation mode. In a continuous conveying mode, the conveyor functions to separate or to singulate loads on the load carrying rollers. Particularly, in a continuous conveying mode the master control valve MCV is operated by any suitable control means to operate the valve to connect port 3 to port 2. This provides constant pressurized air directly from the source of pressurized fluid 170 to the conduit 180 in order to pressurize the clutch C1 and thereby cause it to transfer the drive force from the common power train to the rollers 11 of zone 1. At the same time, the common conduit 180 has also pressurized the brake means B1 which acts to move the cylinder 67 associated with the brake means 28 of zone 1 to actuate the brake means thereof to a nonbraking condition. Accordingly, the application of pressure simultaneously to the clutch C1 and the brake means B1 serves to energize the zone 1 load carrying rollers 11 and to disengage any braking via brake roller 60-1. If any load had been on zone 1, the load would be conveyed downstream therefrom as a result of this control input.

More particularly, pressurization of the clutch C1 effectively connects the drive sprocket 21 with the power train sprockets 72 and 73 and thereby, via the drive chain 18a, drives the downstream most roller 11a in zone 1. Since this roller is connected by means of other drive chains 18 to the other various rollers in zone 1, the entire zone becomes "live" and loads are conveyed therealong in the machine direction such as indicated by the arrow MD of FIG. 1.

The connection of the ports 3 and 2 of the master control valve MCV serves only to connect the source of pressurized fluid directly to the clutch in the first discharge zone 1. While the load remains in zone 1, it depresses the trip roller 50 and the paddle 56 is rotated to operate the plunger D of the control valve CV-1, thus venting the control valve and the conduits 172 and 177. If a load is also present in zone 2 such that it trips the trip roller 50 of that zone, the control valve CV-2 may also be vented. Under such conditions, that is where the control valve CV-1 and CV-2 are vented, there is no pressurized air available for the clutch C2 nor for the brake B2. In this condition the clutch plates of the clutch C2 are normally biased apart and do not serve to connect the common power train with the rollers of zone 2. In addition, pressure is relieved on the air cylinder 67 associated with the brake B2. The spring return air cylinder thus moves the brake actuating arm to a position where the brake is engaged and thus brake roller 60 of zone 2 remains in a braked condition. Any load on zone 2 thus remains stationary in an accumulated condition.

Once the first load which was on zone 1 clears the trip roller 50 of zone 1, the trip roller is moved upwardly causing paddle 56 to rotate and to engage the plunger D of the control valve CV-1. This control valve is operated then to connect the main pressure supply conduit 171 with the conduits 172 and 177. This pressurizes inlet port A of the shuttle valve SV-2 which operates to pass pressurized air from inlet port A to outlet port C. This pressurizes the common conduit 182 and, via conduits 183a and 183b, the clutch C2 is engaged and the brake B2 is disengaged, whereby zone 2 becomes live and is operable to convey any loads thereon in a downstream direction onto zone 1. In this condition, of course, the clutch is pressurized to engage the power train with the rollers of zone 2 while the air cylinder 67 is extended to move the brake arm of brake B2 to position for releasing the brake and the brake roller 60-2 for free rotation as any load on zone 2 moves off that zone. Accordingly, zones 1 and 2 are driven sequentially to discharge any loads thereon in a spaced, separated relationship. Thereafter, the upstream accumulating zones operate in accordance with the conditions of the control valve in the respective zone and in the immediately downstream zone, and the loads are conveyed at similar separations to those of the first two loads discharged.

For example, if a load is on zone 3, then the trip roller 50 of that zone will be depressed, venting the control valve CV-3. Until the load on zone 2 clears zone 2, the control valve CV-2 is also operated to vent it. Accordingly, there would be no pressure in the conduits 173, 178 or 174. The shuttle valve SV-3 would not receive any pressurized air and the conduit 184 would not be pressurized. The clutch C3, then in zone 3, would remain disengaged while the brake B3 remained engaged, until the load in zone 2 cleared the sensor in that zone, operating the control valve CV-2 to pressurize the conduits 173 and 178. This would pressurize the shuttle valve SV-3 through its port A which would then operate to pass pressurized air to the clutch C3 and to the brake B3 in order to drive the zone and to disengage the brake, permitting any load in zone 3 to move downstream.

Accordingly, it will be appreciated that if a load is on the preceding zone, an incoming load on the next upstream zone will cause that next upstream zone to be disengaged from the common power train 70, and will also cause braking of roller 60, so that the load will be accumulated on the upstream zone. The load, then, on the upstream zone, will not be conveyed further until the immediately downstream zone is clear. In addition, it will be appreciated that if there is no load, for example on zone 2, then a pallet moving onto and through zone 3 would not cause zone 3 to be disengaged or braked. Even though the control valve CV-3 would be operated to a vent condition, there would be no load on zone 2 and the control valve CV-2 would remain operable to maintain pressure on the shuttle valve SV-3, causing the drive of zone 3 to operate continuously, and the brake to remain disengaged.

Accordingly, the conveyor operates continuously for so long as two adjacent zones are not loaded. When two adjacent zones are loaded, the upstream zone is disengaged from any drive force and is braked until the immediate downstream zone clears. Accordingly, the accumulating chain conveyor described herein functions to singulate or separate loads even when it continuously conveys.

In a non-continuous or accumulating conveying condition, the master control valve MCV in zone 1 is operated to connect inlet port 1 with outlet port 2, thereby simply passing pressurized air from control valve CV-1 to the clutch C1 and the brake B1. This zone then operates to accumulate packages which may appear thereon. Packages travelling into zone 1 engage the trip roller 50, operate control valve CV-1 to vent and thereby depressurize the clutch and cause the brake B1 to engage. This stops any load in zone 1 and holds it there until the master control valve is moved into a continuous or discharge position, connecting port 3 with port 2 thereof.

It will be appreciated that the trip roller 50 is mounted about an axis of rotation 50a (FIG. 4) such that the trip roller may rotate as loads pass thereover, all the while pivoting the plates 51 and 52 and the paddle 56 as described. In addition, it will be appreciated that the brake rollers 60 are mounted about respective axes of rotation 60a, and that the brake roller freely rotates as loads move thereover when the brake is not engaged. As shown in the plan view of FIG. 4, it will be further appreciated that the axis 50a is downstream of the axis 60a. This will insure that any loads coming down the conveyor will engage the trip roller 50 before the brake roller 60 operates to brake the load. This will insure accurate indexing of the load in the zone, the load always being over the brake roller at the time when the trip roller 50 of the load sensor is operated to disengage the clutch of the zone and to engage the brake of the zone.

It will thus be appreciated that a method of conveying, according to the invention, includes conveying loads through zones by selectively driving load carrying rollers in the zone, sensing and stopping a load on one zone, sensing a second load on a next upstream zone and, in response to said sensing, disengaging load carrying rollers in the upstream zone and braking the second load against downstream motion. The zones are not only disengaged from drive forces, but loads thereon are simultaneously braked, insuring more accurate load indexing. Moreover, the braking and drive disengagement are carried out simultaneously, the braking occurring at a position slightly upstream from the load sensor, insuring accurate load position on the brake and in the zone.

Accordingly, the invention provides an improved accumulator conveyor which prevents load coasting from zone to zone, operates to singulate or separate loads maintaining true zero pressure between loads, provides improved load indexing, and provides means by which a live roller conveyor can be easily modified to an accumulating brake conveyor as described herein.

These and other modifications, alterations and advantages will become readily apparent to those of ordinary skill in the art without departing from the scope of this invention, and applicants intend to be bound only by the claims appended hereto.

We claim:

1. A live roller accumulating conveyor for conveying articles and having a plurality of rollers divided into discrete accumulating zones, each zone including:
   conveyor side rails;
   at least two driven load supporting rollers;
   drive means for selectively driving said rollers disposed between said side rails;
   clutch means for operatively connecting said load supporting rollers to said drive means;
   a separate, non-driven, article supporting brake roller disposed within said zone;
   brake means for selectively braking said brake roller;
   sensing means for sensing loads on said load supporting rollers; and,
   control means operatively connected to said sensing means for engaging said clutch means and disengaging said brake means when no loads are sensed on said load supporting rollers, and for disengaging said clutch means and engaging said brake means in response to actuation of the sensing means of predetermined zones.

2. A conveyor as in claim 1, wherein said clutch means is pneumatic, said brake means is pneumatically controlled, and said clutch means and said brake means are operatively connected to a common pneumatic pressure conduit.

3. A conveyor as in claim 1, wherein each of said zones has a downstream load supporting roller, said brake roller disposed adjacent said downstream load supporting roller just upstream thereof.

4. A conveyor as in claim 3, wherein said brake roller is shorter than said load supporting rollers, an end of said brake roller defining a space between said brake roller and a side rail, and further wherein said brake roller has a rotational axis, said sensing means comprising a trip roller having a rotational axis and being disposed in said space adjacent an end of said brake roller, the axis of said trip roller disposed downstream of the axis of said brake roller.

5. A conveyor as in claim 4, wherein said trip roller is mounted on two side plates pivoted to said conveyor and said sensing means further includes a valve actuating paddle means connecting to said side plates for operating a pneumatic valve when said trip roller is operated by a load.

6. A conveyor as in claim 1, wherein said brake roller is secured to a rotatable shaft and said brake means being operative to selectively brake and release said shaft, said brake means including an actuating arm and a spring return air cylinder connected to said arm for moving said arm to one position for disengaging said brake upon the application of pneumatic pressure to said cylinder, thereby releasing said shaft for rotation, and to another position, upon release of said pressure, for engaging said brake and braking said shaft.

7. A conveyor as in claim 1, including
   cross tie means beneath said side rails tying said rails together at a downstream section of each of said zones,
   elongated frame members parallel to said side rails and mounted between said cross tie means, and
   said sensing means, brake roller and clutch means mounted on said elongated frame members.

8. A conveyor as in claim 1, wherein said drive means includes a common power train extending along said conveyor, said clutch means selectively coupling said load supporting rollers to said power train.

9. A module for providing accumulating and braking functions in a chain driven live roller conveyor for conveying articles, said module including:
   sensing means for sensing loads at a position on the conveyor;
   means for braking loads comprising a non-driven, article supporting brake roller at a position on the conveyor;
   clutch means for connecting selected rollers of said conveyor to means for rotating said rollers; and
   module frame means for supporting said sensing means, means for braking loads and clutch means on said conveyor, said module frame means adapted for mounting on said chain driven live roller conveyor for providing accumulation and braking in a predetermined zone thereof.

10. A module as in claim 9, wherein said sensing means and said braking means each comprise rollers mounted end-to-end, each roller having an axis, the axis of said sensing means roller leading the axis of said braking means roller, with respect to a direction of movement of conveyed articles.

* * * * *